(12) United States Patent
Crowther et al.

(10) Patent No.: US 6,619,547 B2
(45) Date of Patent: Sep. 16, 2003

(54) IMAGE-BASED GRAPHICAL CODE READER DEVICE WITH MULTI-FUNCTIONAL OPTICAL ELEMENT AND CONVERGING LASER TARGETING

(75) Inventors: Blake Crowther, Vail, AZ (US); Ryan Hyde, Draper, UT (US); Collin Lewis, Riverton, UT (US); George Powell, Sandy, UT (US)

(73) Assignee: The Code Corporation, Draper, UT (US)

( * ) Notice: Subject to any disclaimer, the term of this patent is extended or adjusted under 35 U.S.C. 154(b) by 0 days.

(21) Appl. No.: 10/135,198

(22) Filed: Apr. 30, 2002

(65) Prior Publication Data

US 2002/0170965 A1 Nov. 21, 2002

Related U.S. Application Data

(60) Provisional application No. 60/287,658, filed on Apr. 30, 2001.

(51) Int. Cl.[7] .................................................. G06K 7/10
(52) U.S. Cl. .................................. 235/454; 235/472.01
(58) Field of Search ............................ 235/454, 472.01

(56) References Cited

U.S. PATENT DOCUMENTS 6,530,522 B1 * 3/2003 Chuck et al. .......... 235/472.01

* cited by examiner

*Primary Examiner*—Harold I. Pitts
(74) *Attorney, Agent, or Firm*—Madson & Metcalf

(57) ABSTRACT

A graphical code reader is disclosed. The graphical code reader includes control circuitry for the graphical code reader and a multi-functional optical element in electronic communication with the control circuitry. The multi-functional optical element includes a support structure and a monolithic imaging lens and target generating mechanism operably connected to the support structure. The imaging lens and target generating mechanism includes a lens and targeting structures for generating converging offset beams to feedback proper target distance. Laser diodes are positioned by the support structure such that laser light from the diodes is directed through the targeting structures to generate the converging offset beams. An imaging board is connected to the support structure. An imager is mounted to the imaging board and positioned to obtain an image from the lens.

14 Claims, 7 Drawing Sheets

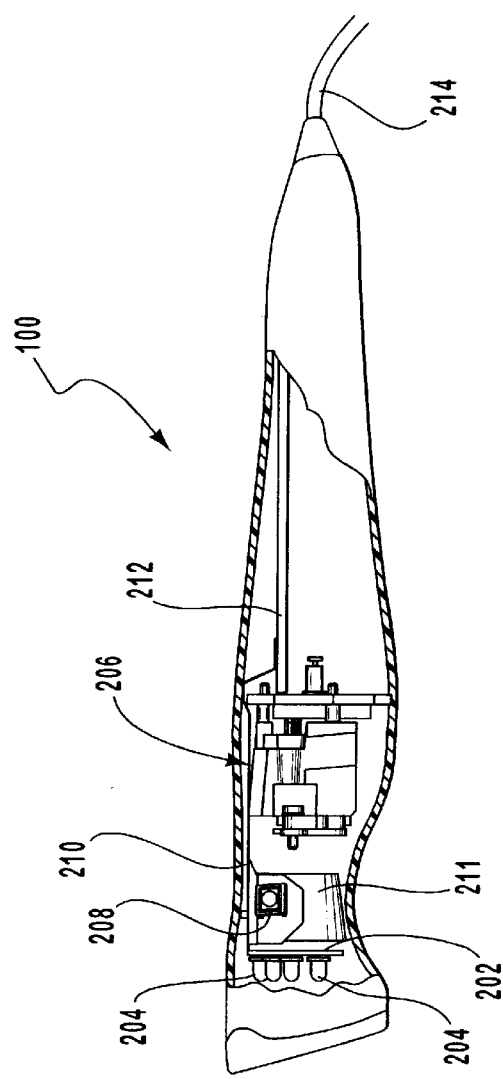
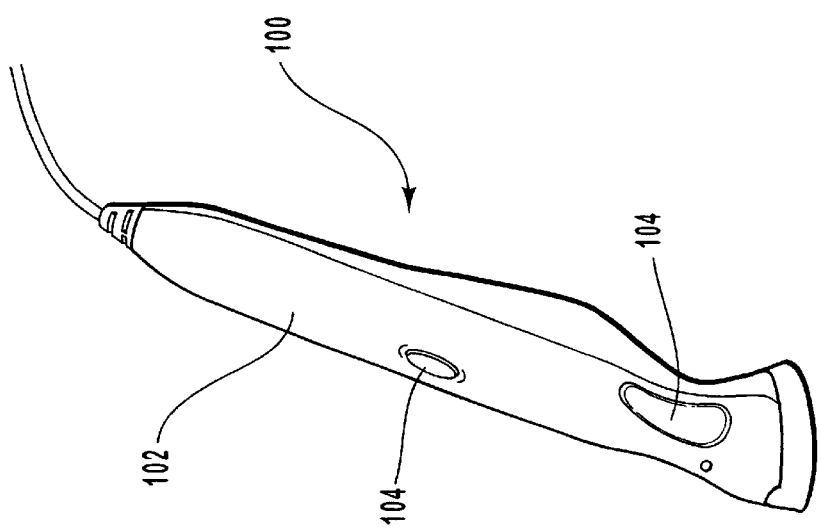
Fig. 2
Fig. 1

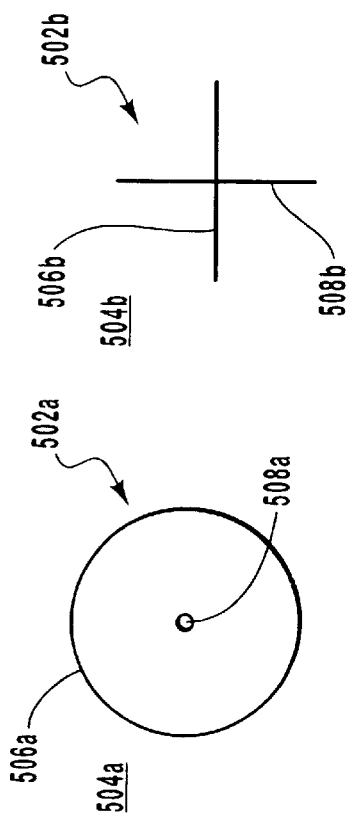
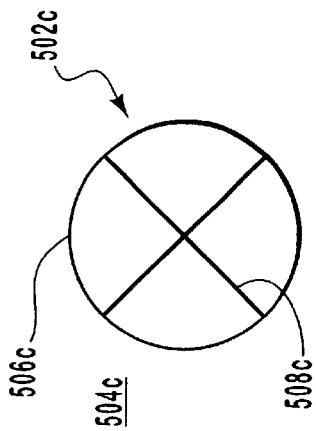
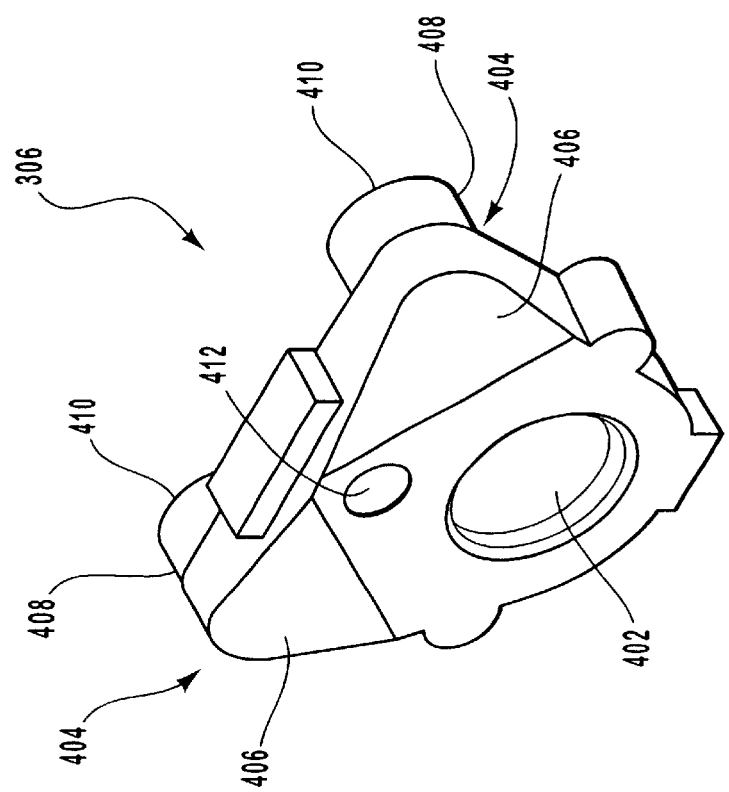

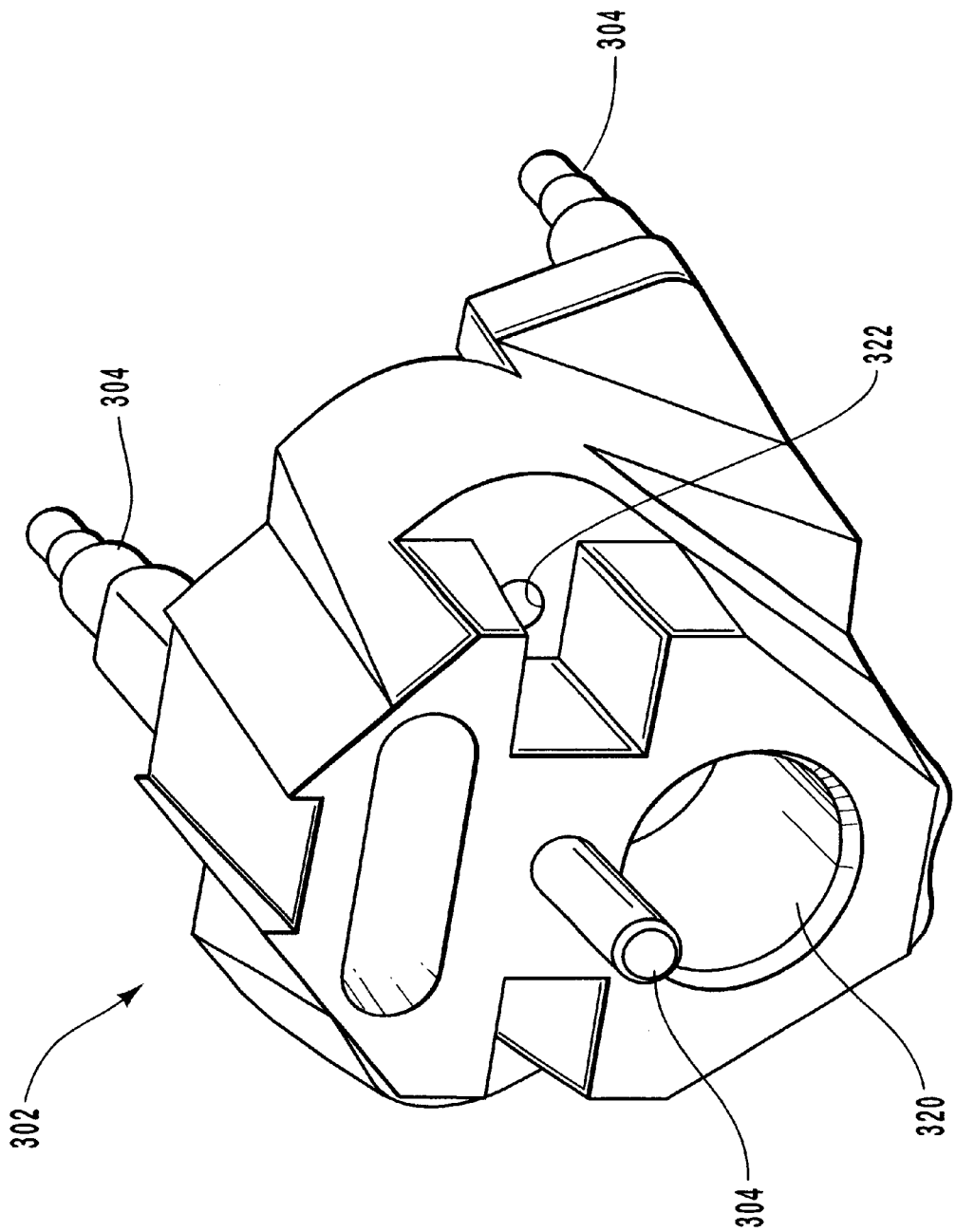

IMAGE-BASED GRAPHICAL CODE READER DEVICE WITH MULTI-FUNCTIONAL OPTICAL ELEMENT AND CONVERGING LASER TARGETING

RELATED APPLICATIONS

This application is related to and claims priority from U.S. Patent Application Serial No. 60/287,658 filed Apr. 30, 2001, for "Image-based Graphical Code Reader Device with Multi-functional Optical Element and Converging Laser Targeting," with inventors Ryan Hyde and Collin Lewis, which is incorporated herein by reference.

BACKGROUND OF THE INVENTION

1. Field of the Invention

The present invention relates generally to the field of graphical-code readers. More specifically, the present invention relates to an image-based graphical code reader with a multi-functional optical element and with converging laser targeting.

2. Description of Related Background Art

Graphical code readers may be used to scan various kinds of graphical codes. Users may greatly benefit from the use of graphical code readers. For example, many different kinds of data may be encoded in a graphical code so that a user may automatically obtain the data through use of a graphical code reader. This automated method for obtaining information typically is used in many different contexts.

As graphical code readers become more complex, more components may be needed by the graphical code reader, which may cause the graphical code readers to increase in size. Space in a hand-held graphical code reader is somewhat limited, and any reduction in the size and/or weight of the components of the graphical code reader adds to the ease of use by the user. In addition, any reduction in the size and/or weight of the components of the graphical code reader may also reduce maintenance of the graphical code reader as well as the overall cost.

Current scanning technologies utilize several separate optical elements. In order to allow the user to specify the code to be scanned, the device incorporates a targeting mechanism. This targeting mechanism is typically an integral part of the scanner and usually consists of a stand-alone unit. In current laser targeting subsystems several components may be used. These components include components such as the lasers, optical collimators, scanning or fixed mirrors, lenses, and diffractive components. The optical focusing mechanisms in current scanner technology are similar in that they serve a single function, that of producing an image of the graphical code on the detector, and are typically separate from other mechanisms in the scanner. The optical focusing mechanisms are typically composed of fixed or scanned mirrors, lenses, and diffractive elements.

It would be beneficial if means were provided to reduce the size of the components of the graphical code reader. Further, it would be beneficial if a multifunctional optical element were provided to reduce the maintenance of the graphical code reader and reduce production costs and complexity.

BRIEF DESCRIPTION OF THE DRAWINGS

Non-exhaustive embodiments of the invention are described with reference to the figures, in which:

FIG. 1 is a perspective view of an embodiment of an image-based graphical code reader device;

FIG. 2 is a side cross-sectional view of the reader device;

FIG. 7 is a perspective view of the imaging lens and target generating mechanism;

FIG. 8a is an embodiment of a targeting image that may be used with the reader device;

FIG. 8b is another embodiment of a targeting image that may be used with the reader device;

FIG. 8c is another embodiment of a targeting image that may be used with the reader device; and FIG. 9 is a perspective view of the support structure.

DETAILED DESCRIPTION

Figure 3:
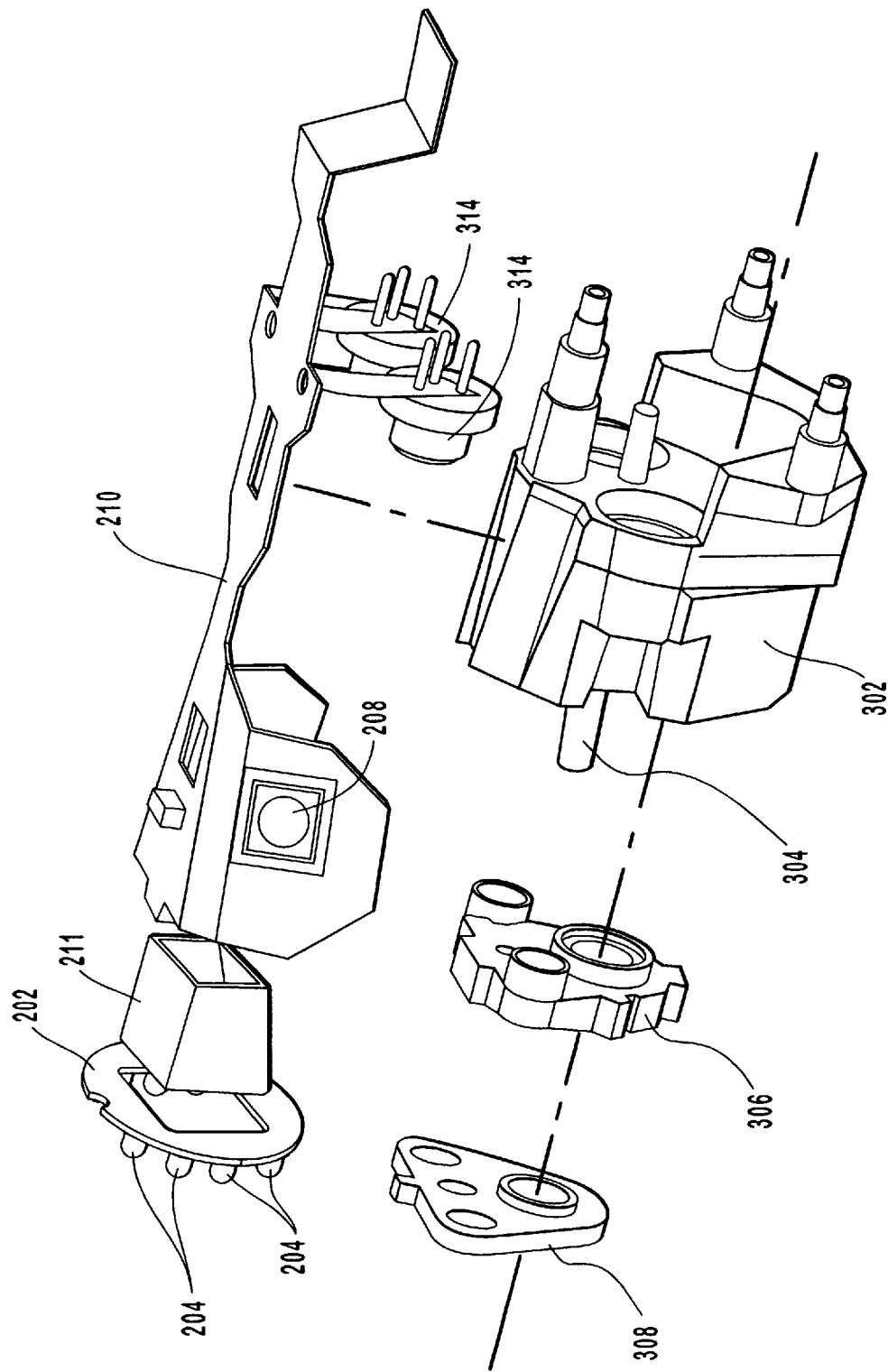
FIG. 3 is an exploded view of internal components of the reader device.

A graphical code reader is disclosed. The graphical code reader includes control circuitry for the graphical code reader and a multi-functional optical element in operation with control circuitry. The multi-functional optical element includes a support structure and a monolithic imaging lens and target generating mechanism operably connected to the support structure. The imaging lens and target generating mechanism includes a lens and targeting structures for generating converging offset beams to feedback proper target distance. Targeting light sources are positioned in the support structure such that light from the targeting light sources is directed through the targeting structures to generate the converging offset beams. An imaging board is connected to the support structure. An imager is mounted to the imaging board and positioned to obtain an image from the lens.

In an embodiment of the graphical code reader an illumination board is also included in electronic communication with the control circuitry. A plurality of illumination light sources may be mounted to the illumination board for providing illumination of a target scanning area.

A lens retainer may be included adjacent the monolithic imaging lens and target generating mechanism. The lens retainer includes a plurality of apertures operably positioned to facilitate operation of the monolithic imaging lens and target generating mechanism.

In a further embodiment, the support structure may also include a post for connecting the monolithic imaging lens and target generating mechanism and the lens retainer to the support structure. In addition, the support structure may include a plurality of posts for connecting the imaging board to the support structure to align the imager with the optical element.

The support structure may include a channel between the imager and the lens. The lens focuses the image of a target scanning area on the imager through the channel. The imager may be a CMOS, CCD, or other pixilated imaging device.

In one disclosed embodiment, the targeting structures each include a prism. The targeting structures may also include a collimating lens. Further, the targeting structures may include an image generating surface for generating a predetermined targeting image or a predetermined aiming pattern. The image generating surface may be a diffractive element.

Each of the targeting light sources may be a laser diode. In addition, each of the plurality of illumination light sources may be an LED, and the illumination board may be an LED board.

A hand-held graphical code reader is also disclosed. The graphical code reader includes control circuitry for the graphical code reader and a multi-functional optical element in electronic communication with the control circuitry. The multifunctional optical element includes an imaging lens and target generating mechanism operably connected to the support structure. The imaging lens and target generating mechanism includes a lens having a predesigned field of view and being aligned to provide user feedback indicating when the target is the proper distance from the device and within the field of view of the imager. The imaging lens and target generating mechanism also includes a first targeting structure for generating a first aiming pattern and a second targeting structure for generating a second aiming pattern. The first and the second aiming patterns converge within the field of view to feedback proper target distance. A first targeting light source is positioned in the support structure such that light from the first targeting light source is directed through the first targeting structure to generate the first aiming pattern. A second targeting light source is positioned in the support structure such that light from the second targeting light source is directed through the second targeting structure to generate the second aiming pattern.

The graphical code reader may also include a lens retainer adjacent to the monolithic imaging lens and target generator. The lens retainer includes a first aperture operably positioned to allow the first aiming pattern from the first targeting structure to pass therethrough. Similarly, the lens retainer includes a second aperture operably positioned to allow the second aiming pattern from the second targeting structure to pass therethrough. A lens aperture is operably positioned for the lens.

The first targeting structure may include a first prism, and the second targeting structure may include a second prism. In addition, the first targeting structure may include a first collimating lens, and the second targeting structure may include a second collimating lens.

The first targeting structure may include a first image generating surface for generating a first predetermined targeting image. Similarly, the second targeting structure may include a second image generating surface for generating a second predetermined targeting image. The first image generating surface may be a first diffractive element, and the second image generating surface may be a second diffractive element.

A multi-functional optical element is also disclosed. The multi-functional optical element includes a support structure and a monolithic imaging lens and target generating mechanism operably connected to the support structure. The imaging lens and target generating mechanism includes a lens and targeting structures for generating converging offset beams to feedback proper target distance. Targeting light sources are positioned by the support structure such that light from the targeting light sources is directed through the targeting structures to generate the converging offset beams. An imaging board is connected to the support structure. An imager is mounted to the imaging board and positioned to obtain an image from the lens.

A multi-functional optical element for use in a hand-held graphical code reader is also disclosed. The multi-functional optical element includes a support structure and a monolithic imaging lens and target generating mechanism operably connected to the support structure. The imaging lens and target generating mechanism includes a lens having a predetermined field of view and being aligned to provide an image of a target in the field of view to the imager. The imaging lens and target generating mechanism also includes a first targeting structure for generating a first aiming pattern and a second targeting structure for generating a second aiming pattern. The first and the second aiming patterns converge within the field of view to feedback proper target distance. A first targeting light source is positioned in the support structure such that light from the first targeting light source is directed through the first targeting structure to generate the first aiming pattern. A second targeting light source is positioned by the support structure such that light from the second targeting light source is directed through the second targeting structure to generate the second aiming pattern.

FIG. 1 is a perspective view of an embodiment of an image-based graphical code reader device 100 with a multi-functional optical element and converging laser targeting. The reader device 100 includes a housing 102 that surrounds the internal components of the reader device 100. One or more buttons 104 may be included on the reader device 100 for turning on and off various features of the device 100.

FIG. 2 is a side cross-sectional view of the reader device 100. An illumination board 202 may have a plurality of illumination light sources 204 mounted thereon to provide illumination for a target scanning area. In the embodiments shown and described herein, the illumination board 202 takes the form of a light emitting diode (LED) board 202, and the illumination light sources 204 take the form of LEDs 204. The LEDs are arranged upon the LED board 202 in a configuration to provide an appropriate amount of illumination for the target scanning area. Those skilled in the art will appreciate the various kinds of LEDs that may be used and the many different ways in which the LEDs may be configured.

A multi-functional optical element 206 is in electronic communication with button actuators 208 through a flexible circuit 210. The button actuators 208 may be mounted to a collar 211. The multi-functional optical element 206 is more fully discussed below. A circuit board 212 comprises the control circuitry for the reader device 100. The circuit board 212 is in electronic communication with an imager (described below). Typically the reader device 100 is provided power through a power cord 214. However, it will be appreciated by those skilled in the art that various means may be used to provide power to the reader device 100. For example, a battery (not shown) may be used to provide power to the device 100.

FIG. 3 is an exploded view of internal components of the reader device 100. As shown, the optical element 206 includes a support structure 302. The support structure 302 includes a post 304 through which an imaging lens and target generating mechanism 306 and a lens retainer 308 are placed onto the support structure 302.

The flexible circuit 210 may provide electronic communication to targeting light sources 314. In the embodiments shown and described herein, the targeting light sources 314 take the form of laser diodes 314. In addition, the flexible circuit 210 provides electronic communication to the LED board 202 and the LEDs 204. In addition, the flexible circuit 210 provides electronic communication to the system electronics board (not shown). The arrows shown in FIG. 3 illustrate how the various components are assembled.

Figure 4:
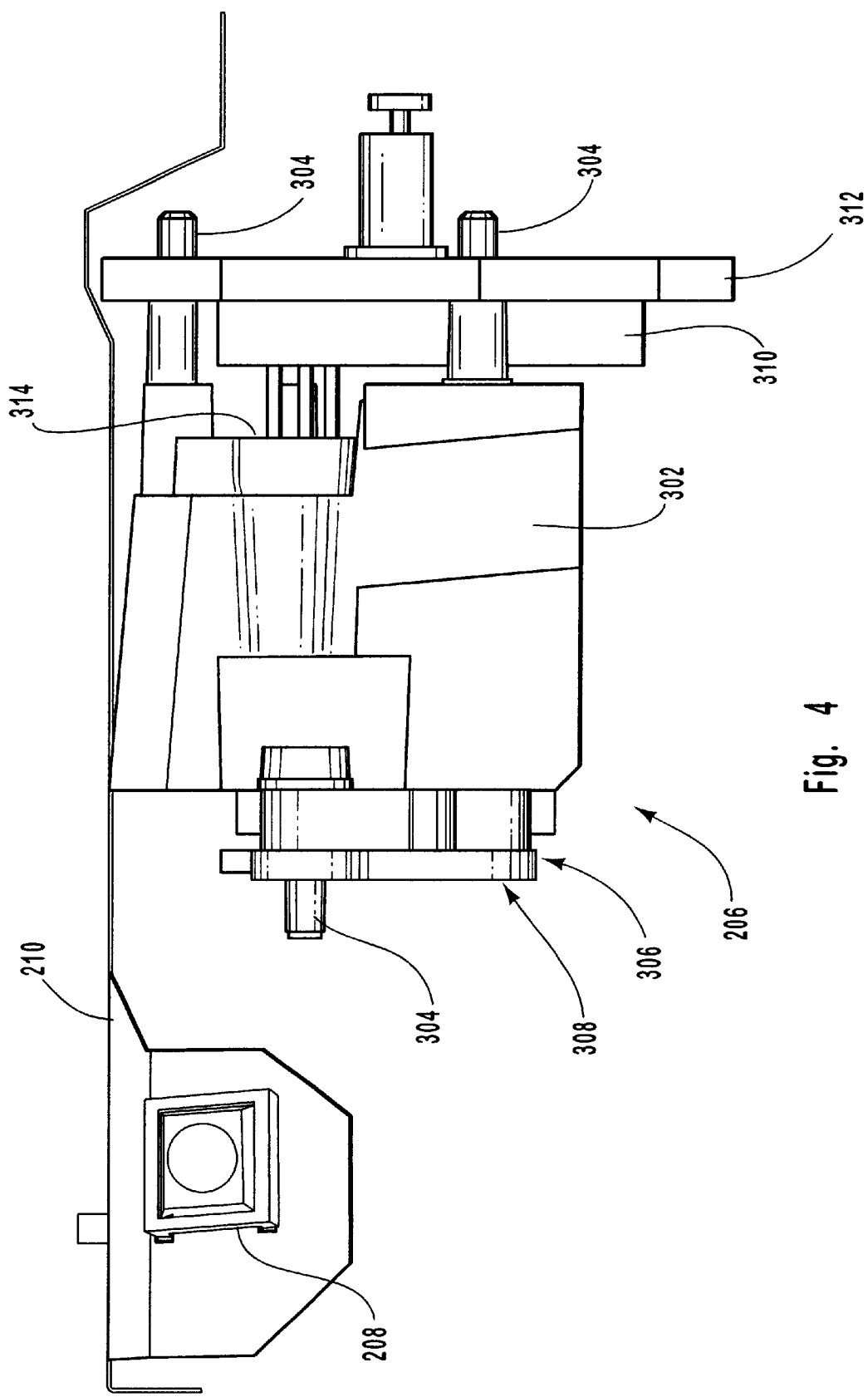
FIG. 4 is a side elevational view of the optical element and the flexible circuit including the button actuators.

FIG. 4 is a side elevational view of the optical element 206 and the flexible circuit 210 including the button actuators 208. The optical element 206 shown in FIG. 4 is substantially assembled from the exploded view of FIG. 3. The optical element 206 includes a support structure 302. The support structure 302 includes a plurality of posts 304 for connecting the support structure 302 to other components of the reader device 100. The optical element 206 also includes an imaging lens and target generating mechanism 306 positioned as shown in FIG. 4. A lens retainer 308 provides apertures (shown in FIG. 4) as needed by the imaging lens and target generating mechanism 306.

An imager 310 is mounted to an imaging board 312 and operates to process the image obtained. As shown, posts 304 are used to align the imager 310 and imaging board 312 with the optical element 302. The term imager may refer to any solid state photodetecting device containing a relatively large number of light sensitive pixels that are arranged in horizontal rows and vertical columns and that are capable of being read electronically to provide a two-dimensional representation of the object being imaged. The imager 310 may be, by way of example only, a CMOS device, a CCD device, etc., which are well known by those skilled in the art and commercially available.

The flexible circuit 210 may also be used to provide electronic communication between laser diodes 314 and the button actuators 208. Laser diodes 314 are commercially available and those skilled in the art will appreciate the various kinds of laser diodes 314 that may be used with the embodiments herein.

Figure 5:
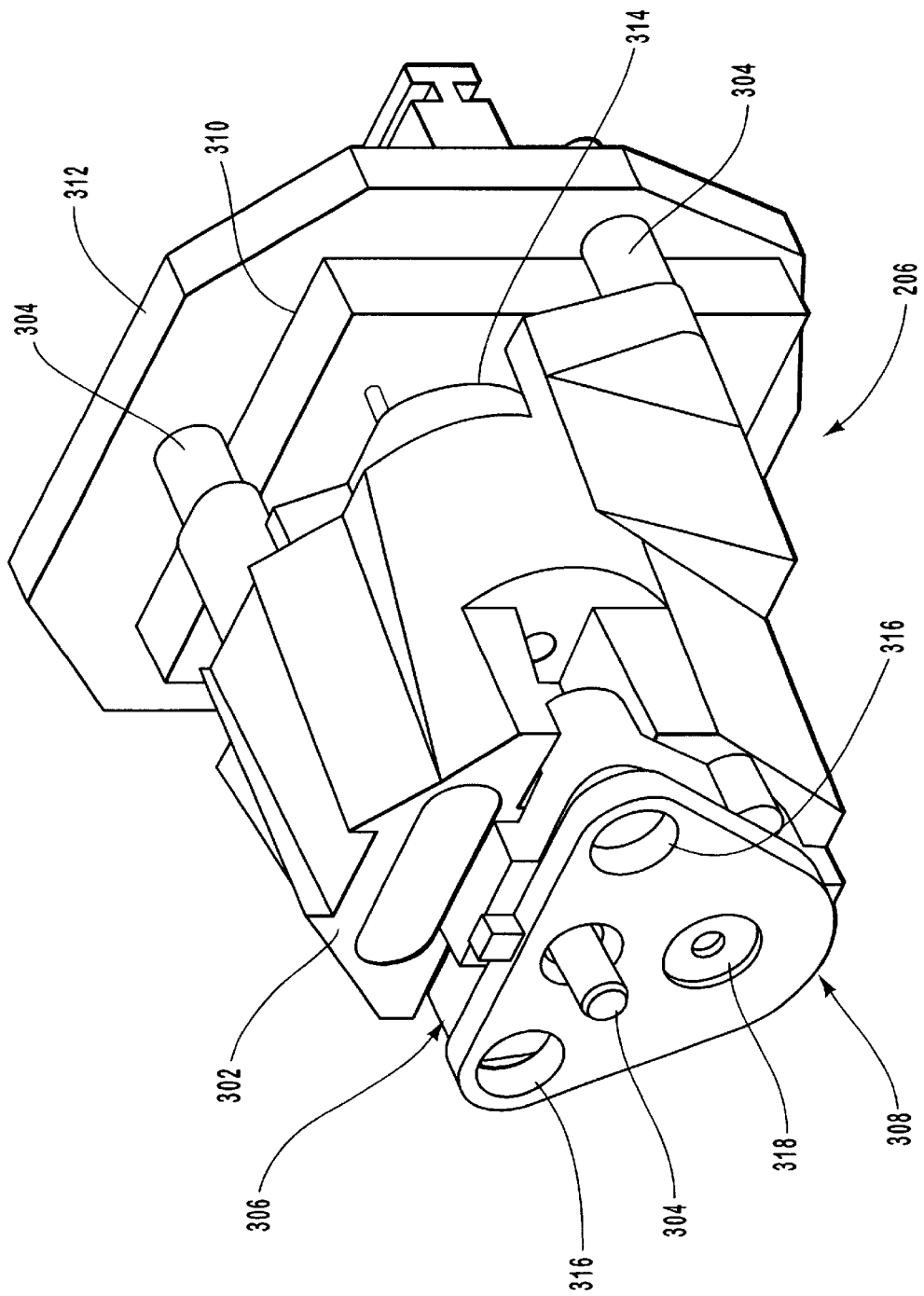
FIG. 5 is a perspective view of the optical element.

FIG. 5 is a perspective view of the optical element 206. As shown, the lens retainer 308 includes apertures 316 for the targeting lasers. The apertures 316 also operate to reduce stray light. The lens retainer 308 also includes a lens aperture 318 so that the image of the target graphical code may be viewed by the lens and the imager 310.

Figure 6:
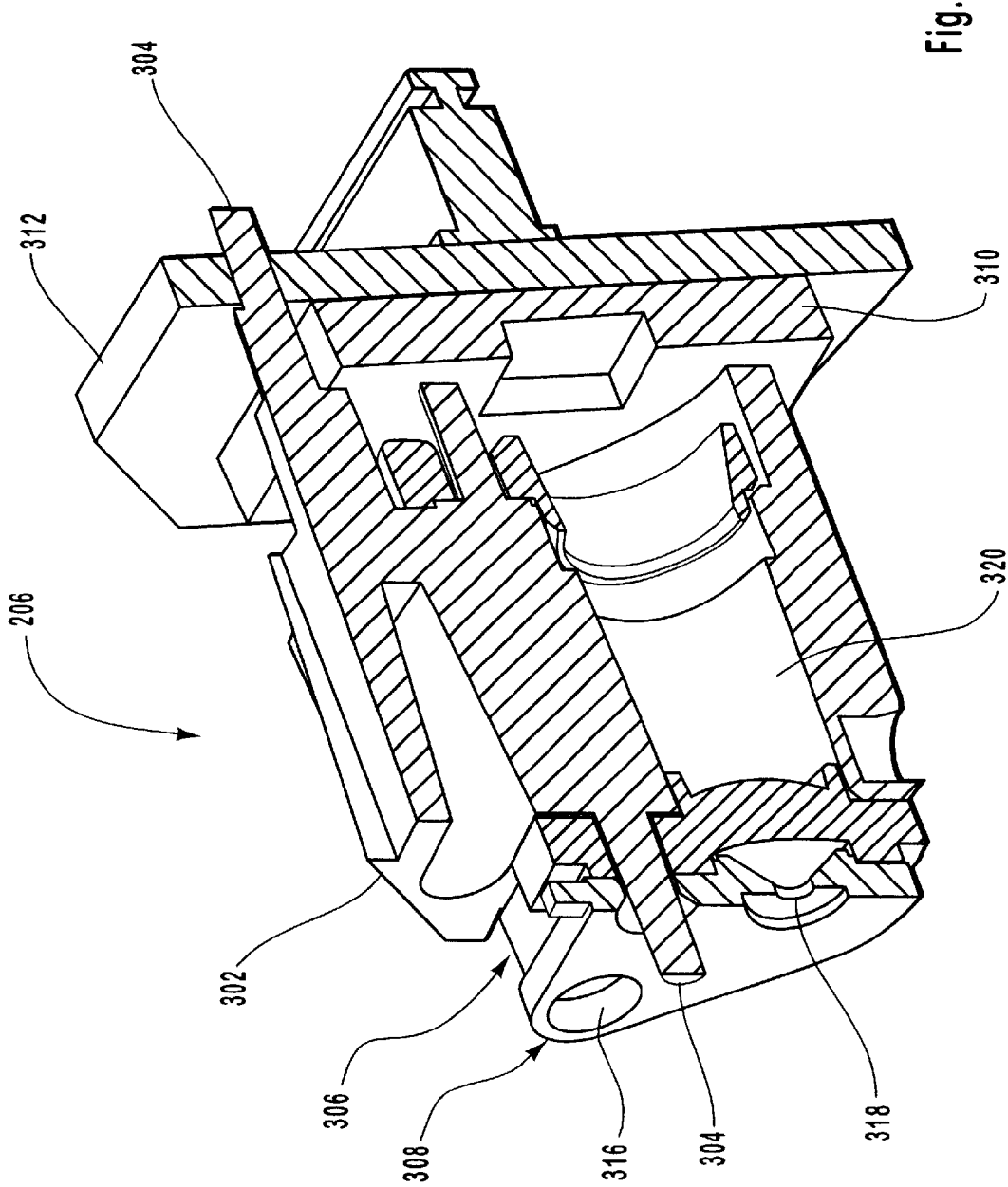
FIG. 6 is a perspective cross-sectional view of the optical element.

FIG. 6 is a perspective cross-sectional view of the optical element 206. FIG. 6 illustrates a channel 320 in the optical element 206 through which the imager 310 obtains an image of the target graphical code from the lens. Those skilled in the art will appreciate an appropriate size of the channel 320 based on the lens 402, the imager 310, etc. The channel acts as a fixturing mechanism for the lens and is sized to meet optical requirements.

FIG. 7 is a perspective view of the imaging lens and target generating mechanism 306. The imaging lens and target generating mechanism 306 is a monolithic component wherein the following elements of the imaging lens and target generating mechanism 306 are all formed in the same part. The imaging lens and target generating mechanism 306 includes a lens 402. The lens 402 is used to focus an image of the target area, which includes a target graphical code when the reader 100 is in use, upon the imager 310.

In embodiments shown and described herein, the imaging lens and target generating mechanism 306 includes two targeting structures 404. Of course, the number of targeting structures 404 shown herein is exemplary only. Those skilled in the art will recognize that the imaging lens and target generating mechanism 306 may only include a single targeting structure 404. Alternatively, the imaging lens and target generating mechanism 306 may include more than two targeting structures 404.

Each targeting structure 404 comprises an angled portion or prism 406, a collimating lens 408, and an image generating surface 410. The angle of the prism 406 is such that the light from the corresponding laser converges on the target area, as will be discussed below. The collimating lens 408 collimates the light from the laser diode 314.

The image generating surface 410 is used to cause the laser light to generate an image on a target. The image generating surface 410 is an interference pattern generating or diffractive element, such as a holographic element that may include one or more diffractive gratings or a Fresnel type element which has been fabricated with the desired pattern in mind.

An aperture 412 is formed in the imaging lens and target generating mechanism 306 for placing the imaging lens and target generating mechanism 306 on a post 304 of the optical element 206.

The targeting structures 404 generate an aiming pattern which is defined and has a shape or configuration that facilitates the accurate positioning of the target graphical code or symbol with respect to the field of view of the imager 310. Typically the lens 402 enables the code reader 100 to be usable over a range of reader 100 to target distances.

The unique targeting structures 404 use converging offset beams to feedback proper target distance. The beams from the targeting structures are non-parallel and each projects a point or pattern onto the target scanning area to be targeted. At the optimal target distance the beams cross, and the projected patterns and/or points meet. Nearer and further than optimal target distance, the projected patterns and/or points do not meet. As the device 100 is moved further from optimal target distance, the user sees the projected patterns and/or points move further apart or to move further away from alignment. As the device 100 is moved nearer to optimal target distance, the user sees the projected patterns and/or points move toward each other or more toward alignment and ultimately become aligned when optimal target distance is reached.

Various materials may be used to form the imaging lens and target generating mechanism 306. Those skilled in the art will appreciate the different materials that may be used based on design and cost factors. In one embodiment, an optical grade polycarbonate may be used for the imaging lens and target generating mechanism 306.

Advantageously, the multi-functional optical element 206 may allow the reader device 100 to be more robust than known reader devices. Typically, the components that make up a reader device have low tolerances. Because the reader device 100 disclosed herein includes a multi-functional optical element 206, the reader device 100 may be less susceptible to alignment problems normally associated with the shock and rigors of daily use.

FIGS. 8a–8c illustrate various targeting images that may be used. The targeting structures 404 are used to generate a predetermined targeting image 502a on a target surface 504a. The image generating surfaces 410 are designed to generate the desired image 502a on the target surface 504c. As shown in FIG. 8a, one possible targeting image 502a that may be used is a circle 506a with a dot 508a in the center. With this targeting image 502a, the diffractive element 406 is designed such that when the reader 100 is an optimal distance from the targeting surface 504a, the dot 508a is substantially in the center of the circle 506a. With the targeting image 502a of FIG. 8a, one image generating surface 410 is designed to generate the circle 506a while the other image generating surface 410 is designed to generate the dot 508a.

As shown in FIG. 8b, another possible targeting image 502b that may be used is a cross comprising a horizontal bar 506b and a vertical bar 508b. With this targeting image 502a, the diffractive element 406 is designed such that when the reader 100 is an optimal distance from the targeting surface 504a, the horizontal bar 506b and vertical bar 508b intersect each other to form a cross. One image generating surface 410 is designed to generate the horizontal bar 506b while the other image generating surface 410 is designed to generate the vertical bar 508b.

Another possible targeting image 502c is shown in FIG. 8c comprising a circle 506c and an X 508c. With this targeting image 502c, the diffractive element 406 is designed such that when the reader 100 is an optimal distance from the targeting surface 504a, the X 508c is aligned inside the circle 506c. To generate this targeting image 502c, one image generating surface 410 is designed to generate the circle 506c while the other image generating surface 410 is designed to generate the X 508c.

As shown, many different kinds of targeting images 502 may be generated to assist the user in using the code reader 100 to read in a graphical code. The user may see when the reader 100 is at an optimal distance from the targeting surface 504a by seeing that the targeting image 502 is aligned. FIGS. 8a–8c illustrate various aligning targeting images 502. Many other patterns or types of targeting images 502 are possible and it will be understood that the embodiments disclosed herein are not limited to any particular pattern or type of targeting image 502. However, it will be appreciated by those skilled in the art that many other targeting images 502 may be used to assist the user in placing the code reader 100 at an optimal position.

Due to diode packaging tolerances, some commercially available laser diodes 314 may not emit laser light from the same position within the diode package as others. For example, one laser diode 314 may emit laser light from the upper left corner of the diode package, while another laser diode 314 may emit laser light from the lower right corner of the diode package. Such non-uniformity may cause the targeting image 502 to be misaligned at the proper target distance. To address this potential problem, laser diodes 314 to be used in assembling code readers 100 may be examined and grouped according to the point from which the diodes 314 emit laser light, and then diodes 314 from the same group may be used together in a particular code reader 100. For example, laser diodes 314 that emit laser light from the upper left corner of the diode package may be grouped together and used together in assembling code readers. Similarly, laser diodes 314 that emit laser light from the lower left corner of the diode 314 may be grouped together and used together in assembling code readers. As a result, substantially uniform laser diodes 314 may be used in assembling a code reader 100. The process of identifying similarly operating diodes 314 may be referred to as matching, and laser diodes 314 from the same group may be referred to as matched diodes 314.

FIG. 9 is a perspective view of the support structure 302. The support structure 302 includes laser diode apertures 322 for allowing the light from the laser diodes 314 to pass through to the imaging lens and target generating mechanism 306.

Various materials may be used to form the support structure 302. Those skilled in the art will appreciate the different materials that may be used based on design and cost factors. In one embodiment, a material with a high dimensional fidelity is used. A glass filled nylon, such as krastin, may be used to form the support structure 302.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A multi-functional optical element for use in a graphical code reader, the multi-functional optical element comprising:

a support structure;
  a monolithic imaging lens and target generating mechanism operably connected to the support structure, wherein the imaging lens and target generating mechanism includes a lens and targeting structures for generating converging offset beams to feedback proper target distance;
  targeting light sources positioned by the support structure such that light from the targeting light sources is directed through the targeting structures to generate the converging offset beams;
  an imaging board connected to the support structure; and
  an imager mounted to the imaging board and positioned to obtain an image from the lens.

2. The multi-functional optical element as defined in claim 1 further comprising a lens retainer adjacent the monolithic imaging lens and target generating mechanism, wherein the lens retainer includes a plurality of apertures operably positioned to facilitate operation of the monolithic imaging lens and target generating mechanism.

3. The multi-functional optical element as defined in claim 2 wherein the support structure further comprises a post for connecting the monolithic imaging lens and target generating mechanism and the lens retainer to the support structure.

4. The multi-functional optical element as defined in claim 1 wherein the support structure further comprises a plurality of posts for connecting the imaging board to the support structure to align the imager with the optical element.

5. The multi-functional optical element as defined in claim 1 wherein the imager is a CMOS device.

6. The multi-functional optical element as defined in claim 1 wherein the support structure comprises a channel between the imager and the lens.

7. The multi-functional optical element as defined in claim 1 wherein the lens focuses the image of a target scanning area on the imager.

8. The multi-functional optical element as defined in claim 1 wherein each of the targeting structures comprises a prism.

9. The multi-functional optical element as defined in claim 1 wherein each of the targeting structures comprises a collimating lens.

10. The multi-functional optical element as defined in claim 1 wherein each of the targeting structures comprises an image generating surface for generating a predetermined targeting image.

11. The multi-functional optical element as defined in claim 10 wherein the image generating surface comprises a diffractive element.

12. The multi-functional optical element as defined in claim 1 wherein each of the targeting structures comprises an image generating surface for generating a predetermined aiming pattern.

13. The multi-functional optical element as defined in claim 12 wherein the image generating surface comprises a diffractive element.

14. The multi-functional optical element as defined in claim 1 wherein each of the targeting light sources comprises a laser diode.

\* \* \* \* \*